United States Patent
Girden

[15] 3,683,627
[45] Aug. 15, 1972

[54] INDUCED CONTROLLED UPWELLING

[72] Inventor: Barney Girden, 32 W. 76th St., New York, N.Y. 10023

[22] Filed: May 28, 1970

[21] Appl. No.: 41,432

[52] U.S. Cl. .................................................61/1 R
[51] Int. Cl. .............................................E02b 3/00
[58] Field of Search .....61/1; 261/121, 123; 210/167, 210/170, 221

[56] References Cited

UNITED STATES PATENTS

| 3,452,966 | 7/1969 | Smolski | 261/123 X |
| 2,057,389 | 10/1936 | Meek | 261/123 |
| 1,154,507 | 9/1915 | Gorton | 261/123 |
| 3,429,676 | 2/1969 | Gatza | 261/123 X |
| 3,109,288 | 11/1963 | Gross | 61/1 R |
| 3,066,476 | 10/1961 | Halpert | 261/121 X |
| 3,320,928 | 5/1967 | Smith | 61/1 R |

Primary Examiner—Peter M. Caun
Attorney—Lackenbach & Lackenbach

[57] ABSTRACT

Improved means and method for upwelling or raising sub-surface water to the surface of a body of water for manifold purposes. By dissolving air in the water and providing excess air, the water rises in a vertical current and is accelerated as the pressure on the water at various levels decreases toward the surface, causing the water to give off the dissolved air in a multitude of tiny bubbles which further accelerates the flow of water to the surface.

5 Claims, 3 Drawing Figures

Patented Aug. 15, 1972

3,683,627

INVENTOR
BARNEY GREEN

BY
Blum, Moscovitz, Friedman & Kaplan
ATTORNEYS

INDUCED CONTROLLED UPWELLING

BACKGROUND OF THE INVENTION

This invention relates generally to improved means and techniques for upwelling water in a body of water. It is known to be desirable for a variety of purposes to be able to change the water temperature at the surface of a body of water or to oxygenate the water or cause an upward current which can raise materials, such as nutrients, from the ocean bottom.

Bubbling air through water is currently practiced to eliminate ice or prevent its formation and to oxygenate polluted water. The general method in use is to bubble air through the water and break up the thermocline and bring the whole mass of water to an even temperature so that convection can operate.

However, by the method and apparatus of the instant invention, only a fraction of the total volume of water is used in the method with flow being upward in one or a plurality of vertical columns, rather than over an entire area.

While ice control provides one example of use of the instant invention, this invention is deemed to have far-reaching advantages with regard to environmental control. By cooling the surface of a body of water to reduce the temperature at the surface to a value below the temperature at the earth's surface adjacent the body of water, the greater density of the air above the cooler body of water will replace the lesser density of air above the land to create an on-shore breeze. Controlling the air currents in this manner can be used for a number of purposes.

By creating the on-shore wind, the techniques of this invention can be used to bring moisture to arid coastal lands. By inducing convection a distance from the land so that the cold, on-shore wind passes over warmer water on its way to shore and absorbs enough moisture to become saturated, rain and increased humidity can be brought to the land. If necessary, the moisture-laden, on-shore wind can be seeded if additional rain is required.

A typical hurricane will have the power of 500,000 atomic bombs of the type used at Nagasaki and it is known that a hurricane creates substantial devastation. The hurricane derives its energy from the accumulation of the heat of evaporation over vast areas of water. As the water evaporates, it draws its heat from the body of water, thereby cooling the water and such cooled water, together with the water cooled in winter and that coming from submarine and antartic currents is stored below the surface in the ocean and retained under the warmer water at the surface. By using the techniques of the instant invention, the cooler sub-surface water could be brought to the surface to balance the heat and prevent development of the hurricane. For example, 500 square miles of cooled ocean surface would represent 1,500,000 square miles of air as the specific heat of water is more than 3,000 times that of air. 500 square miles of cooled ocean water could be sufficient to balance the heat causing the hurricane.

In costal areas and under certain conditions, induced convection to cool the ocean surface can prevent the formation of fog. For example, the Los Angeles International Airport often has a serious fog problem. During the day, when the land is warmer than the ocean surface, the onshore winds blow air at the same temperature as that of the ocean surface, absorbing the least amount of moisture as it passes over the water and fog does not develop in this atmospheric condition. At night, the land gets colder than the ocean surface and an off-shore wind blows colder air over the warmer ocean. The air heats by convection, causing the greatest absorption of moisture. The dew point is reached and the fog develops. As the land warms in the morning, the highly saturated air created by the off-shore wind is blown back over the land by the developing on-shore wind. By using the techniques of the instant invention, the surface can be cooled to prevent development of the off-shore wind and thus the moisture-laden air will not develop to be driven back to the land in the morning hours.

The techniques of the instant invention can also be used as an aid to combatting water pollution. The techniques described hereinafter will be particularly effective for oxygenating pollutants prior to further treatment of the water, if necessary. Pollutants such as waste material destroy plant and marine life by using up the oxygen in the water. This process oxygenates organic materials, de-gassing solids so that they sink and also oxygenates odorous substances by bubbling air through the polluted water. With this process, numerous oxygen bubbles remain in suspension for a more effective oxygenation of the pollutants. The air-saturated water rising from the sub-surface becomes super-saturated and minute bubbles develop in enormous quantities. In fact, so many bubbles will be developed that the water appears to be nothing but a multitude of tiny bubbles which are so small that they escape slowly and thus remain in the suspension. When the upwelled water reaches the surface, the horizontal current radiating in circular symmetry from the vertical upward jet, contains the maximum amount of bubbles retained for the maximum time.

Another area of pollution is the heat pollution developed from the discharge of substantial quantities of warm water into a body of water by electrical generating plants. The discharge of warm water into rivers, lakes and estuaries upsets the balance in water and thermally pollutes same, thereby damaging marine and plant life. This invention minimizes the need for costly cooling towers. With the techniques of the instant invention, air under pressure is dissolved into the water of the rivers and lakes at its greatest depth so that the coldest water available is reached. The bubbles used by this method will help force this deep, air-saturated water to rise. As the water rises, the pressure decreases and the air-saturated water becomes super-saturated. As the vast quantities of bubbles turbulently break through the surface, they cause large scale evaporation. The water is further cooled by the evaporation to offset the heat supplied by the warm water delivered from the power plant.

The melting of ice has been previously mentioned. With the techniques of the instant invention, much larger scale ice-melting operations can be accomplished to keep clear bays, harbors and waterways. For example, induced convection could cause a fast current of ice-free, saline, relatively warm water from below to drive to the surface and spread horizontally, sinking before becoming cold enough to freeze while it is at the surface. Continual replacement with fresh streams of warm, sub-surface water could keep large bodies of water open.

In keeping ice-bound water areas open by the use of induced convection, the only energy requirement that must be supplied by the apparatus described in this invention is that necessary to operate the compressor, bringing air down to the dissolving chambers to be hereafter described. The energy to propel and accelerate the velocity of the jet stream is furnished by the constantly increasing buoyancy of the air super-saturated water. This water, in addition to preventing the formation of ice, can melt the ice already formed.

As salt water freezes, it pushes out the salt so that the ice at the surface is relatively salt-free. The freezing point of water decreases as the salt content increases. Thus, the water brought from the depth will melt the ice or prevent its forming since it will have a higher salt content, a sufficient temperature difference and a sufficient volume. The salt content of the depth water will be increased at the surface as it dissolves the salt that has been crystalized out of the ice formed in the surface water. The air-saturated water, due to the reduced pressure, on reaching the surface, gives up its bubbles and resumes normal weight and when the horizontal current of the jet stream meets the opposing horizontal current of corresponding units on both sides, they both sink to be replaced by water from the continuing horizontal spread of the jet stream propelled from below in accordance with the upwelling techniques disclosed herein.

SUMMARY OF THE INVENTION

Generally speaking, in accordance with the invention, upwelling of sub-surface water is accomplished by pumping air into the lowest of a series of dissolving chambers. In the chambers, the air is dissolved in a series of vertically-spaced chambers to thereby saturate the water. Undissolved air also forms bubbles to lift the water and commence the formation of a jet stream. As the jet stream develops and moves upwardly from a substantial depth, the pressure within the water decreases whereby the amount of air soluble in the water becomes less and the water becomes saturated and then super-saturated. When the water reaches a super-saturated condition, a multitude of tiny bubbles form to accelerate the upward travel of the stream. Acceleration continues and, as the pressure becomes less, more bubbles are formed and the formed bubbles become larger and larger. In this manner, a jet stream is formed which reaches the surface of the water and spreads outwardly in a horizontal radiating current to cool the water at the surface. The only energy requirement that must be supplied for development of the jet stream is that necessary to operate the compressor bringing air down to the dissolving chamber. The energy to propel and accelerate the velocity of the jet stream is furnished by the constantly increasing buoyancy of free bubbles and air super-saturated water.

Accordingly, it is an object of this invention to provide a method and apparatus for inducing convection in water between heavier water at a depth and the lighter water above it.

A further object of the invention is to provide an apparatus and method to lower the surface temperature of water to change the temperature of the air above it and create air currents and wind as the result of temperature differentials.

Another object of the invention is to provide a system for cooling a body of water.

Still another object of the invention is to provide a system for increasing the oxygen content of water for the purpose of oxygenating pollutants.

Still other objects and advantages of the invention will in part be obvious and will in part be apparent from the specification.

The invention accordingly comprises the several steps and the relation of one or more of such steps with respect to each of the others, and the apparatus embodying features of construction, combination of elements and arrangement of parts which are adapted to effect such steps, all as exemplified in the following detailed disclosure, and the scope of the invention will be indicated in the claims.

For a fuller understanding of the invention, reference is had to the following description taken in connection with the accompanying drawing, in which.

To accomplish the purposes of the instant invention, it is necessary to dissolve air into the water well below the surface of the water. Dissolving the air in the water is to be distinguished from releasing air from holes in a pipe and permitting the air to bubble up through the water. It is known that water holds in solution certain amounts of air with there being a saturation point. Water is generally not saturated and this is especially true with respect to sub-surface or subterranean water. Thus, by providing suitable apparatus, air can be dissolved into the water and the methods of the instant invention are based on dissolving air into the water so it is saturated. The excess bubbles start the upward motion of the saturated water until this water forms its own buoyancy. The current thus started continues its drive to the surface at an ever accelerating speed for the purpose of cooling the water at the surface.

Figure 1:
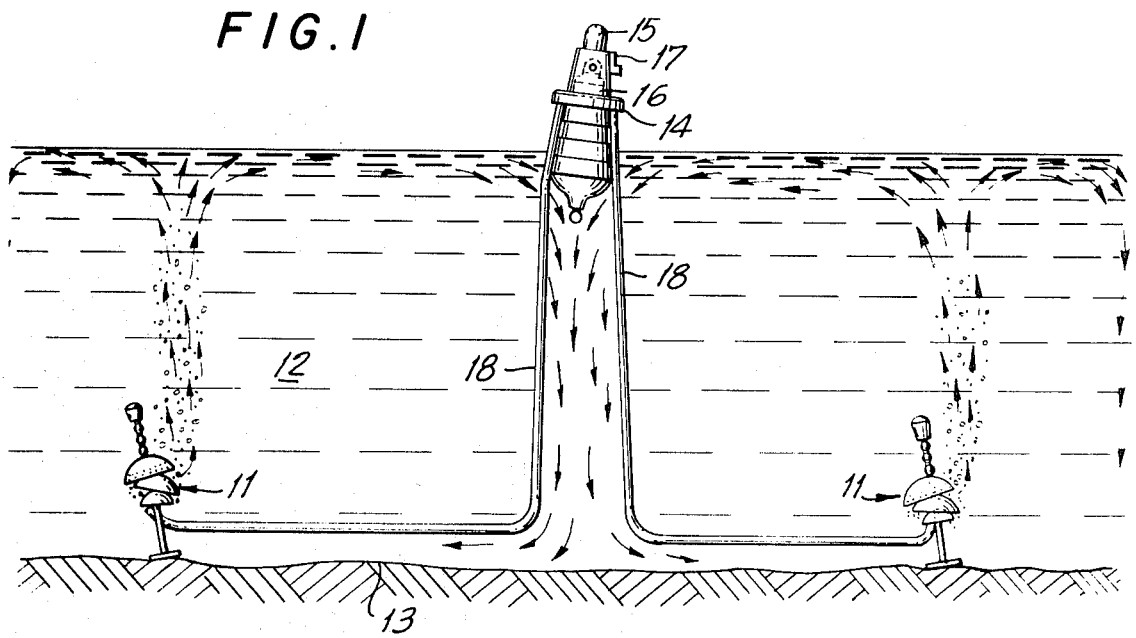
FIG. 1 is a schematic representation of an upwelling system embodying the instant invention with the air compressor being located in a buoy.

Referring to FIG. 1, the dissolving apparatus is indicated generally at 11 and two such dissolving units are shown. Dissolving apparatus 11 is placed at spaced locations within the body of water 12 with the dissolving apparatus located well below the surface of the water. The dissolving apparatus may rest on the ocean floor 13 or may be suspended at some point below the surface, depending on the depth required for the particular purpose to be accomplished.

In the embodiment shown in FIG. 1, which is especially suitable if the techniques of the instant invention are to be carried out well beyond the shore line, a buoy 14 of any suitable construction is provided which preferably is provided with a signal light 15. Within the buoy is a compressor 16 preferably mounted on a gimbal and supplied with fuel from a tank within the buoy. Any suitable type of air inlet valve 17 provides the inlet of the compressor and the outlet is through tubes 18. FIG. 1 shows two tubes 18 delivering air to the dissolving apparatus 11. The dissolving apparatus will be described in detail in connection with FIG. 3.

The flow pattern of the cold sub-surface water is shown by the arrows wherein the cold water flows upwardly as a jet stream from each of the dissolving apparatus and, when it reaches the surface, spreads across the surface in an outwardly radiating flow. As the water gives up air, and the energy from the upwardly moving jet stream formed from the dissolving apparatus dissipates, the cold water regains its greater density and sinks with respect to the less dense water at and below the surface to set up a circular flow as indicated by the arrows to provide a mixing of the water and a cooling of the surface water.

Figure 2:
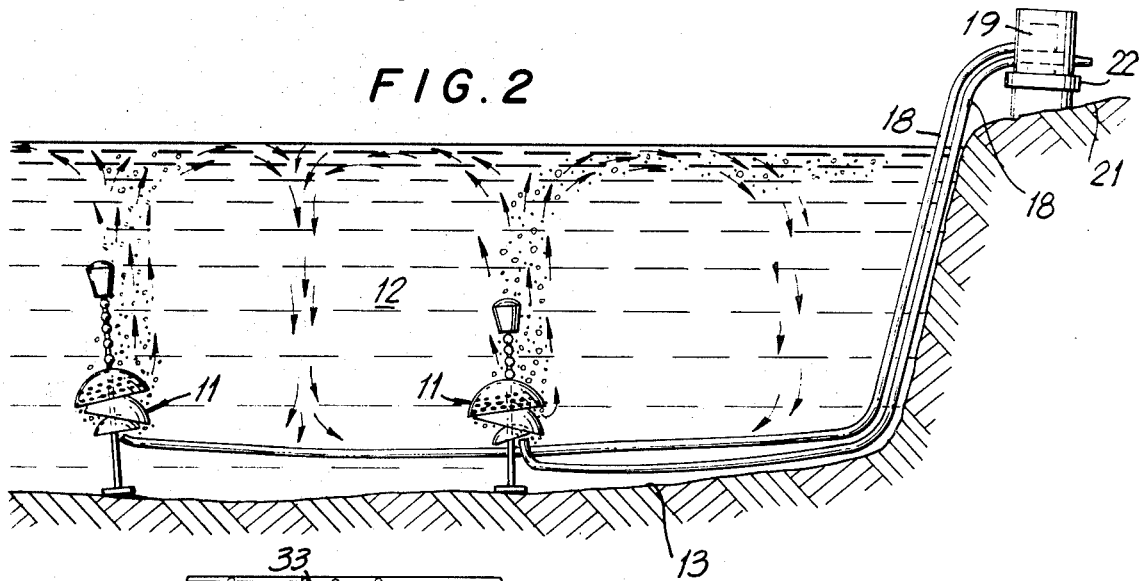
FIG. 2 is a schematic representation of an upwelling system embodying the instant invention with the air compressor mounted on land.

In the arrangement of FIG. 2, compressor 19 is mounted on the shore 21 on any suitable base 22 and power is supplied to the compressor by any suitable means (not shown). From the compressor, tubes 18 carry the compressed air to the sub-surface dissolving apparatus 11 and a circular flow of the type described in connection with FIG. 1 is also set up as indicated by the arrows in FIG. 2. The number and size of dissolving apparatus provided will depend on the amount of surface water to be cooled which will be dictated by the particular use to which the system of the instant invention is to be put. For example, if large areas are to be cooled, a plurality of dissolving apparatus 11 can be located in a checkerboard arrangement with a distance of approximately one-eighth mile between each apparatus. If sub-surface water is to be brought to the surface for a small area only, it may be necessary to use only a single dissolving apparatus 11.

Figure 3:
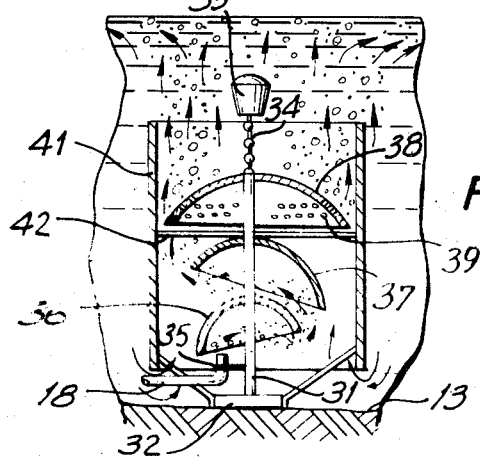
FIG. 3 is an enlarged sectional view of an air-dissolving device constructed in accordance with a preferred embodiment of the instant invention.

A preferred form of the dissolving apparatus is disclosed in FIG. 3. A stem 31 extending upwardly from a weighted base 32 has at its upper end a float 33 connected to the stem by a chain 34. Cooperation between the float 33 and the weighted base 32 keeps the apparatus in the upright position and the weighted base keeps the apparatus below the surface of the water at the desired level. If it is desired for the dissolving apparatus to be above the floor of the body of water, suitable modifications can be made in the structure to permit the apparatus to remain at the desired level below the surface of the water and above the floor.

Mounted on stem 31 are a plurality of vertically spaced air traps which may take the form of domes. A bracket 35 positions the exit end of tube 18 so as to deliver compressed air upwardly into the lowermost dome 36. Dome 36 is constructed so as to be semi-spherical in shape and preferably imperforate. The dome is mounted in tilted relationship with respect to stem 31 so that the lower edge proximate the inlet end of tube 18 is lower than the lower edge on the opposite side of the stem. Compressed air delivered from tube 18 will collect within dome 36 where it will have an opportunity to mix with and be absorbed by the water. The excess air and water that has become saturated as a result of air having been dissolved therein will escape around the lower edges of dome 36 and especially the highest edge of dome 36 and will travel upwardly into a second dome 37 which is also mounted on the stem above dome 36. Dome 37 also has the shape of a semi-sphere and is imperforate and is tilted in a direction opposite to the direction of tilt of dome 36. Dome 37 is of larger cross-sectional dimension than dome 36 so as to capture a maximum amount of upward flow delivered from dome 36. Within dome 37 the undissolved air collects providing an additional station to dissolve the air into the water.

Excess air and the saturated water escapes from dome 37 about the edge thereof and is collected by a third dome 38, which, if the final dome, preferably has the plane of its edge perpendicular to stem 31. Dome 38 is also formed in the shape of a semi-sphere and is provided with a plurality of apertures 39 extending through the surface of the dome. Within dome 38, additional undissolved air collects and an additional station is provided to permit the air to be dissolved by the water.

The saturated water and the air will naturally tend to flow upwardly and escapes around the edge of dome 38 as well as through the plurality of apertures 39. Undissolved air escaping through apertures 39 will form small bubbles which will travel upwardly with the saturated water, thereby forming and accelerating a vertical jet stream. The dissolving apparatus preferably includes an open-ended cylinder 41 secured to stem 31 by means of struts 42. The jet stream formed within the cylinder will cause water to flow into the cylinder from the bottom and travel upwardly therethrough to become saturated in the manner heretofore described.

As any unit of water which has been made saturated as a result of the air dissolved therein moves upwardly, the pressure on the unit of water continuously decreases as the unit moves toward the surface of the body of water. The amount of air that the water can dissolve is directly proportional to the pressure on the water and thus, as the unit of water flows upwardly, it becomes saturated and super-saturated. When the state of super-saturation is reached, the water commences the release of tiny bubbles thereby further aerating the water and accelerating the jet stream. As the bubbles move toward the surface, the pressure on them continuously decreases, whereby the bubbles become larger and larger, so that further acceleration is imparted to the jet stream.

When the unit reaches the surface of the water, it breaks through and radiates outwardly from the center of the stream to spread the cooler sub-surface water over the surface of the warmer water. As the sub-surface water spreads, it gives up its air which drove it to the surface and also loses the kinetic energy of the jet stream and the colder water starts to sink since it is heavier than the warmer water at or near the surface of the body. This creates a circular flow of the type indicated by the arrows in FIGS. 1 and 2 and sets up convection currents so that there is a mixing of the surface and sub-surface water. This mixing cools the water at the surface for the purposes heretofore described. Of course, if there is ice at the surface, then the ice is colder than the sub-surface water and raising the sub-surface water to the surface will accomplish the de-icing function.

The apparatus shown in FIG. 3 is but one embodiment of apparatus suitable for accomplishing the methods of the instant invention. The primary function of the apparatus is for dissolving the air into the water so that the water becomes saturated and releases bubbles so that it commences an upward travel. With the increase in dissolved air in the water, the water will become saturated and super-saturated as it travels upwardly as the result in decrease in pressure in the water at different depth levels so that air, in the form of tiny bubbles, comes out of the water and further increases the buoyancy of the water so that it travels upwardly in the form of a jet stream.

Utilizing the air traps or domes shown in FIG. 3 will accomplish the methods of the instant invention. Naturally, any number of domes can be used and, in a minimal situation, a single dome may accomplish the desired result.

With the instant invention, the energy or power required to raise the sub-surface water is only that necessary to bring the compressed air to the dissolving unit. The energy to raise the water is supplied by the buoyancy of the bubbles.

As the depth of the water increases, its temperature is lower and its density is greater. In the Los Angeles area, where the techniques of the instant invention can be used to dissipate fog, the temperature of the ocean at the surface during summer is about 70° while the sub-surface water has a temperature of about 45°. The difference in density is such that the deep water is about 0.1 pounds per cubic foot heavier than the surface water. The object of the invention is to dissolve sufficient air into the heavier water and provide excess air that will travel upwardly, thereby inducing convection and causing the colder water to rise and to spread over the warmer surface. Thereafter, as the water loses its buoyancy, it descends in a vertical current to its temperature level.

Considering a unit of one cubic foot of water having a weight of about 62.5 pounds, the 0.1 pound differential in density per cubic foot will be the equivalent of approximately 3 cubic inches of the water at atmospheric pressure. By displacing 3 cubic inches of the water by the air bubbles, the 45° water will be made lighter and more buoyant than the surface water and, as the water rises and the pressure on it decreases, more and more bubbles will form in the water, making it increasingly more buoyant and causing it to accelerate upwardly. The excess bubbles start the upward motion of the heavier water and the upward movement is accelerated as the bubbles become larger due to decreased pressure and as the number of bubbles increase as the result of super-saturation of the water as the pressure becomes less. Thus, it is seen that, in order to raise a cubic foot of water, it is only necessary to provide an input of sufficient air under pressure to displace approximately 3 cubic inches of water.

As noted aforesaid, the techniques of the instant invention have almost limitless potential for environmental control. Arid coastal lands can be moisturized, fog can be prevented or dissipated, hurricanes can be warded off, ice can be controlled, and water pollution by wastes and thermal pollutants can be overcome. Also, nutrients can be brought to the surface.

It will thus be seen that the objects set forth above, among those made apparent from the preceding description, are efficiently attained and, since certain changes may be made in carrying out the above process and in the construction set forth without departing from the spirit and scope of the invention, it is intended that all matter contained in the above description and shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

What is claimed is:

1. A system for supplying air under pressure to water below the surface thereof to raise the sub-surface water to the surface comprising means for compressing ambient air, tube means for delivering air compressed by said compressing means to a location at a pre-selected depth within a body of water, said tube means having an outlet from which said compressed air is delivered, and dissolving apparatus at said location for receiving compressed air from said outlet for dissolving at least some but not all of said compressed air into the water at said location, said dissolving apparatus comprising a plurality of downwardly-opening closed top generally dome-shaped air traps spaced generally vertically one above another, said outlet being located adjacent the open end of the lowermost of said air traps to deliver air into the open end thereof and the downwardly facing opening of each upper air traps being located to receive air escaping from a lower air trap.

2. A system as claimed in claim 1 wherein said outlet is located below the open end of said lowermost air trap.

3. A system as claimed in claim 1 wherein the opening in a lower air trap lies in a plane, said lower air trap being oriented to locate said plane at an angle to the horizontal.

4. A system as claimed in claim 1 wherein at least one of said air traps is provided with a plurality of apertures through a portion of a wall thereof spaced generally downwardly of the closed top thereof for permitting air to escape therethrough in a vertically upward direction.

5. A system as claimed in claim 1 further comprising a generally vertically disposed sleeve open at opposite ends thereof surrounding said air trap, said downwardly opening air trap facing generally towards the lowermost open end of said sleeve.

* * * * *